United States Patent
Dantressangle

(10) Patent No.: US 6,446,120 B1
(45) Date of Patent: *Sep. 3, 2002

(54) CONFIGURABLE STRESSER FOR A WEB SERVER

(75) Inventor: Patrick Dantressangle, San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,049

(22) Filed: Nov. 26, 1997

(51) Int. Cl.⁷ .......................... G06F 15/173; H02H 3/05
(52) U.S. Cl. ...................... 709/224; 709/219; 709/203; 714/38; 714/47; 717/135
(58) Field of Search ................. 709/223, 224, 709/203, 210, 217; 714/25, 38, 37, 47, 31; 717/4, 135

(56) References Cited

U.S. PATENT DOCUMENTS

| | | | |
|---|---|---|---|
| 5,440,719 A | | 8/1995 | Hanes et al. |
| 5,459,837 A | | 10/1995 | Caccavale |
| 5,471,634 A | | 11/1995 | Giorgio et al. |
| 5,475,843 A | * | 12/1995 | Halviatti et al. ................ 714/4 |
| 5,544,310 A | | 8/1996 | Forman et al. |
| 5,553,235 A | | 9/1996 | Chen et al. |
| 5,627,766 A | | 5/1997 | Beaven |
| 5,640,537 A | * | 6/1997 | Jessen et al. .................. 703/23 |
| 5,669,000 A | * | 9/1997 | Jessen et al. ................... 714/4 |
| 5,734,831 A | * | 3/1998 | Sanders ...................... 709/223 |
| 5,758,062 A | * | 5/1998 | McMahon et al. ............ 714/38 |
| 5,799,142 A | * | 8/1998 | Toyoda ........................ 714/38 |
| 5,812,780 A | * | 9/1998 | Chen et al. .................. 709/224 |
| 5,819,066 A | * | 10/1998 | Bromberg et al. .......... 707/102 |
| 5,881,219 A | * | 3/1999 | Leung et al. .................. 714/31 |
| 5,881,269 A | * | 3/1999 | Dobbelstein ........... 395/500.42 |
| 5,889,955 A | * | 3/1999 | Shinozaki et al. .......... 709/224 |
| 5,940,593 A | * | 8/1999 | House et al. ................ 709/203 |
| 5,946,695 A | * | 8/1999 | Hinrichs et al. ............. 707/103 |
| 5,974,572 A | * | 10/1999 | Weinberg et al. ............. 714/47 |
| 6,002,871 A | * | 12/1999 | Duggan et al. ................. 717/4 |

OTHER PUBLICATIONS

Silicon Graphics, Inc., Internet article, http://www.sgi.com/Products/WebForce/WebStone/index.html, "World Wide Web Server Benchmarking", 1996 (entire document).
Silicon Graphics, Inc., Internet article, http://www.sgi.com/Products/WebForce/WebStone2.html, "Introducing WebStone 2.0", 1996 (entire document).
Trent, Gene, Silicon Graphics, Inc., Internet article, http://www.sgi.com/Products/WebForce/WebStone/paper.html, "WebStone: The First Generation in HTTP Server Benchmarking", Feb. 1995 (entire document).
Mercury Interactive Corporation, Internet article, http://www.merc–int.com/products/astrastguide.html, "Astra Site Test™", 1997 (entire document).
Ziff–Davis Benchmark Operation, Internet article, http://www.softweek.com/Internet/W . . . Site_Tools/Review2_7657_index.html, "WebBench" (entire document).

* cited by examiner

Primary Examiner—Glenton B. Burgess
Assistant Examiner—Abdullahi E. Salad
(74) Attorney, Agent, or Firm—Sughrue Mion, PLLC

(57) ABSTRACT

A method, apparatus, and article of manufacture for a computer implemented configurable stresser for testing a server computer. A server computer is tested by transmitting commands to the server computer from a client computer which is connected via a network. Each command is performed by the server computer to access data from a data source stored on a data storage device connected to the server computer. In particular, at the client computer, one or more virtual browsers are created for transmitting commands to the server computer. Compared test results are received from each virtual browser indicating a response to each transmitted command received from the server computer. The received test results are consolidated into a report of compared test results.

42 Claims, 13 Drawing Sheets

```
#hostname=phil.stl.ibm.com
#port=80
#output=NULL
#storefailedonly
#sequential
#numberoftest=10
#reqlatency=1000
#alltimes=0
#HTTP/1.0
#authorization=userid:passoword
#timer:mytimer1:EXEC SQL "SELECT * from authors"
#=== comment ===
GET /cgi-bin/db2www/test/tsq101.d2w/report
#compare=tsq101.res
GET /cgi-bin/db2www/test/tsq102.d2w/report
#compare=tsq102.res
GET /cgi-bin/db2www/test/tsq103.d2w/report
#compare=tsq103.res
```

FIG. 7

| What's New? | What's Cool? | Destinations | Net Search | People | Software |

© 1995 IBM Corporation

STRESSER FOR WEB SERVERS

Fill the informations Below:  [Launch] [Reset]

| Test Host | |
|---|---|
| Port | |
| Display All results(0=no, 1=yes) | |
| Result File | |
| Number of simultaneous processes(<100) | 5 |
| Number of HTTP request launched per process | 20 |
| HTTP Requests to launch (without GET).<br><br>As many as possible. Choosed randomly between all of them. | |
| Test File: If you have already done one test file. choose it! This will override these above fields except number of simultaneous processes. | These files are located in :/u/db2web/WWW/pub/v2code/v2macro/stressdir<br>tst/tt2.tst |

| | Request Avg | Request Min | Request Max | Conn.failed/ launched | Results corrects/ incorrects | Max Connections time | Throughput Received/ process |
|---|---|---|---|---|---|---|---|
| Process0 | 0.116 | 0.054 | 0.166 | 0/20 | 0/20 | 0.006 | 17.360 |
| Process1 | 0.116 | 0.053 | 0.156 | 0/20 | 0/20 | 0.003 | 19.398 |
| Process2 | 0.117 | 0.053 | 0.165 | 0/20 | 0/20 | 0.001 | 19.260 |
| Process3 | 0.115 | 0.041 | 0.157 | 0/20 | 0/20 | 0.003 | 17.602 |
| Process4 | 0.115 | 0.049 | 0.151 | 0/20 | 0/20 | 0.004 | 18.501 |
| Nb processes launched:5 | 0.116s | 0.041s | 0.166s | 0/100 400=0 404=0 500=0 503=0 | 0/100 | <0.006s | 18.424Kb/s |

Result Files generated in files :tt2.out.0 to tt2.out.4

1002

| Nb processes launched : | 5 |
|---|---|
| Connections failed: | 0/100 |
| Errors 400/404/500/503: | 0/0/0/0 |
| Compared results succeed/failed: | 0/100 |
| Avg Throughput/process: | 18.424Kb/s |
| Total Server Throughput: | 92.121Kb/s |
| Max Connection : | 0.006s |
| Avg Request : | 0.116s |
| Min Request : | 0.041s |
| Max Request : | 0.166s |
| Avg Request/second : | 43.125s |

1004

Test File used :tst/tt2.tst

```
#hotstname=avalon.stl.ibm - ibm.com
#port=8094
#output=tt2.out
#storefailedonly
#sequential
#numberoftest=20
#reqlatency=0
#alltimes=0
#  http/1.0
#   authorization=Aladdin: open sesame
#verifydir=./res
GET /fcgi-bin/db2www/tt2.d2w/report
#compare=tt2.res
#  GET /fcgi-bin/db2www/tt3.d2w/report
#  compare=tt3.res
```

*FIG. 10*

```
┌─────────────────────────────────────────────────┐
│  ▬                    Telnet - shiva             │
│  Connect   Edit   Terminal   Help                │
│                                                  │
│                                                  │
│                                                  │
│                                                  │
│                                                  │
│     HTTP request latency=1000                    │
│                                                  │
│                                                  │
│   <br>                                           │
│   <br>                                           │
│   <TABLE BORDER=1>                               │
│                                                  │
│   <TR><TD><TD><b>Request Avg<TD><b>Request Min<TD><b>Request Max<TD><b>Req. │
│   failed                                         │
│   /launched<TD><b>Max Connections time<TD><b>Throughput Received/process │
│   <TR><TD align=center><b>Process0<TD align=center>2.370<TD align=center>1.039<TD │
│   align=center>12.909<TD align=center>0/10<TD align=center>0.004<TD align=center>3.130 │
│   <TR><TD align=center><b>Nb processes launched:1<TD align=center><b> 2.370s │
│   <TD align=center><b> 1.039s                    │
│   <TD align=center><b> 12.909s                   │
│   <TD align=center><b> 0/10                      │
│   <TD align=center><b><0.004s                  │
│   <TD align=center><b> 3.130Kb/s                 │
│                                                  │
│   </TABLE>                                       │
│   <br>                                           │
│   <br>                                           │
│   <TABLE BORDER=1>                               │
│                                                  │
│   <TR><TD><b>Nb processes launched :<TD align=center> 1 │
│   <TR><TD><b>Number of Requests failed:<TD align=center><b> 0/10 │
│   <TR><TD><b>Avg Throughput/process:<TD align=center> 3.130Kb/s │
│   <TR><TD><b>Total Server Throughput:<TD align=center> N/A because request latency │
│   >0                                             │
│   <TR><TD><b>Max Connection      :<TD align=center> 0.004s │
│   <TR><TD><b>Avg  Request        :<TD align=center> 2.370s │
│   <TR><TD><b>Min  Request        :<TD align=center> 1.039s │
│   <TR><TD><b>Max Request         :<TD align=center> 12.909s │
│   </TABLE>                                       │
│   [shiva v2macro/stressdir]▮                     │
└─────────────────────────────────────────────────┘
```

CONFIGURABLE STRESSER FOR A WEB SERVER

BACKGROUND OF THE INVENTION

1. Field of the Invention

This invention relates in general to computer-implemented testing systems, and, in particular, to a configurable stresser for a Web server.

2. Description of Related Art

The Internet is a collection of computer networks that exchange information via Transmission Control Protocol/Internet Protocol ("TCP/IP"). The Internet computer network consists of many internet networks, each of which is a single network that uses the TCP/IP protocol suite. Currently, the use of the Internet computer network for commercial and non-commercial uses is exploding. Via its networks, the Internet computer network enables many users in different locations to access information stored in data sources (e.g., databases) stored in different locations.

The World Wide Web (i.e., the "WWW" or the "Web") is a hypertext information and communication system used on the Internet computer network with data communications operating according to a client/server model. Typically, a Web client computer will request data stored in data sources from a Web server computer, at which Web server software resides. The Web server software interacts with an interface connected to, for example, a Database Management System ("DBMS"), which is connected to the data sources. These computer programs residing at the Web server computer will retrieve the data and transmit the data to the client computer. The data can be any type of information, including database data, static data, HTML data, or dynamically generated data.

Traditional techniques for testing computer programs on a Web server computer do not test real world models. That is, the traditional techniques do not test computer programs residing at the Web server in conjunction with typical conditions on the network. Instead, only particular computer programs on the Web server computer are tested (i.e., regression testing) or predefined tests are run on the computer programs that provide performance results only. There is a need in the art for improved testing of computer programs on a Web server.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented configurable stresser.

In accordance with the present invention, a server computer is tested by transmitting commands to the server computer from a client computer which is connected via a network. Each command is performed by the server computer to access data from a data source stored on a data storage device connected to the server computer. In particular, at the client computer, one or more virtual browsers are created for transmitting commands to the server computer. Compared test results are received from each virtual browser indicating a response to each transmitted command received from the server computer. The received test results are consolidated into a report of compared test results.

An object of the invention is to provide improved testing of Web servers on the internet. Another object of the invention is to provide testing of Web servers in a real world environment using simulated virtual Web browsers. Yet another object of the invention is to enable users to create tests for their particular Web server environments. An additional object of the invention is to combine regression and performance testing, which is required in current Web Server environments.

BRIEF DESCRIPTION OF THE DRAWINGS

Referring now to the drawings in which like reference numbers represent corresponding parts throughout:

FIG. 7 illustrates a sample test guide file according to the preferred embodiment of the present invention;

FIG. 9 illustrates a Web page for launching the configurable stresser when an existing test guide file is selected according to the preferred embodiment of the present invention;

FIG. 10 illustrates the HTML results from the configurable stresser when a test launched in the Web mode is completed according to the preferred embodiment of the present invention;

FIG. 12 illustrates the results from the configurable stresser when a test launched in the UNIX command line mode is completed, with the HTML page option set, according to the preferred embodiment of the present invention.

DETAILED DESCRIPTION OF THE PREFERRED EMBODIMENT

In the following description of the preferred embodiment, reference is made to the accompanying drawings which form a part hereof and which is shown by way of illustration a specific embodiment in which the invention may be practiced. It is to be understood that other embodiments may be utilized as structural changes may be made without departing from the scope of the present invention.

Hardware Environment

Figure 1:
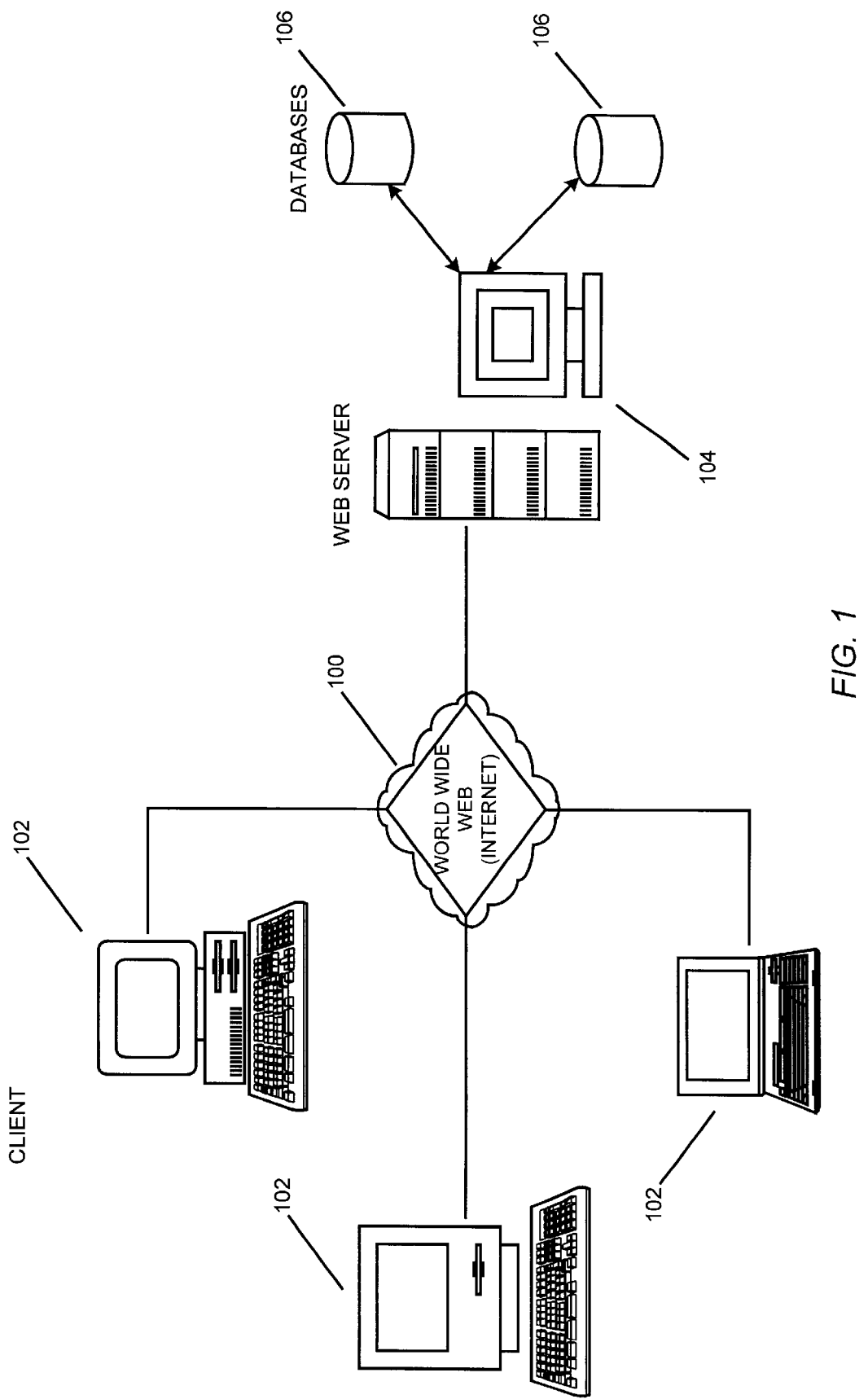
FIG. 1 schematically illustrates the hardware environment of the preferred embodiment of the present invention.

FIG. 1 schematically illustrates the hardware environment of the preferred embodiment of the present invention, and more particularly, illustrates a typical distributed computer system using the Internet 100 to connect client computers 102 executing a configurable stresser to a Web server computer 104 executing Web daemons and other computer programs (e.g., a data source interface), and to connect the server system 104 to data sources 106. A typical combination of resources may include client computers 102 that are personal computers or workstations, and a web server computer 104 that is a personal computer, workstation, minicomputer, or mainframe. These systems are coupled to one another by various networks, including LANs, WANs, SNA networks, and the Internet.

A client computer 102 typically executes a configurable stresser and is coupled to a Web server computer 104 executing Web server software. The configurable stresser launches virtual Web browsers, each of which simulates a typical Web browser. Each Web browser performs tests on the Web server. The Web server software is typically a program such as IBM's HTTP Daemon or other WWW daemon. The Web server computer 104 also executes a data source interface and, possibly, other computer programs, for connecting to the data sources 106. The client computer 102 is bi-directionally coupled with the Web server computer 104 over a line or via a wireless system. In turn, the Web server computer 104 is bi-directionally coupled with data sources 106.

The data source interface may be connected to a Database Management System (DBMS), which supports access to a data source 106 by executing RDBMS software. The interface and DBMS may be located on the same server as the Web server computer 104 or may be located on a separate machine. The data sources 106 may be geographically distributed. The data source interface translates the data request received from a configurable stresser into one or more statements (e.g., a macro file or a COBOL program) that can be processed to retrieve data from data sources 106.

Those skilled in the art will recognize many modifications may be made to this configuration without departing from the scope of the present invention.

Figure 2:
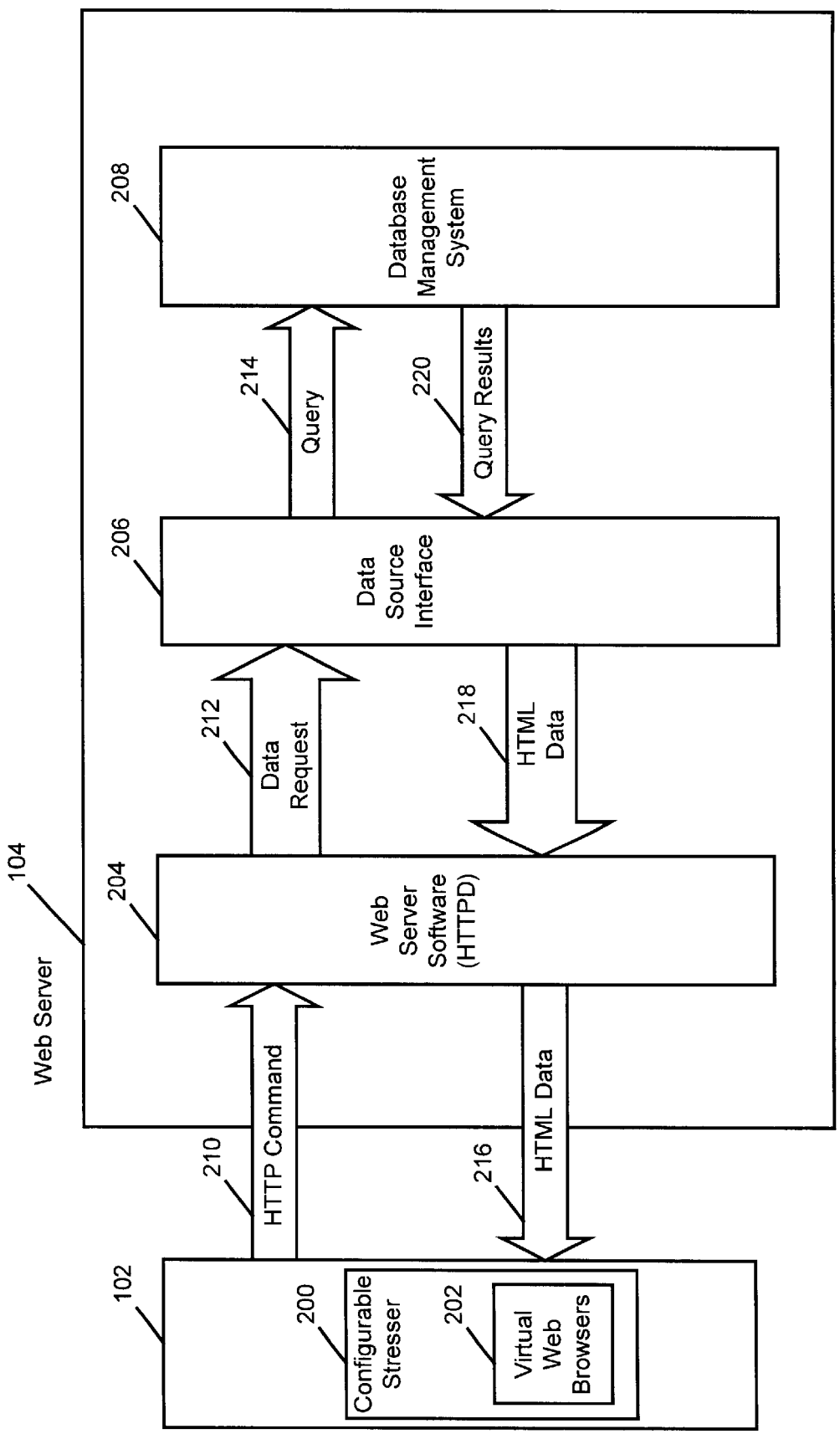
FIG. 2 schematically illustrates the interaction between the client and the server to access data in a database according to the preferred embodiment of the present invention.

FIG. 2 schematically illustrates the interaction between the client 102 and the server 104 to access data in a database according to the preferred embodiment of the present invention. The user interacts with the configurable stresser 200 executing on a client computer 102 remotely located from the Web server computer 104. At some point, the user launches the configurable stresser 200. In turn, the configurable stresser 200 launches virtual Web browsers 202 to stress the Web server 104. Each virtual Web browser 202 sends an HTTP command (e.g., data request) via connection 210 that results in communication with an HTTP daemon (HTTPD) 204 (i.e., Web server software) executing on the Web server computer 104. The Web server software 204 transmits, via connection 212, the HTTP command to the data source interface 206, which translates the command received in HTTP to a query (e.g., SQL query).

The data source interface 206 will then transmit, via connection 214, the query to a database management system ("DBMS") 208. The DBMS 208 will process the query and retrieve data (i.e., query results) from the data source 106, and transmit the date to the data source interface 206 via connection 220. The data source interface 206 translates the data results into HTML data for transmission, via connection 218, to the Web server software 204. In turn, the Web server software 204 will transmit, via connection 216, the HTML data to the virtual Web browsers 202, which transmit the data to the configurable stresser 200 for display at the client computer 102. It is envisioned in the preferred embodiment of the invention that the Web server 104 conforms to the Common Gateway Interface (CGI) defined for Web servers, and thus can be invoked from an HTML page in one of two ways: either by an HTTP anchor reference or by an HTTP form action.

Currently, several standards exist that can be used for programming and structuring the data source interface 206 between the HTTP daemon 204 and the DBMS 208. These standards include the Common Gateway Interface (CGI), the Netscape Server Application Programming Interface (NSAPI), and the Internet Connection Server Application Programming Interface (ICAPI). For illustration purposes only, the data source interface 206 between the HTTP daemon 204 and the DBMS 208 herein is assumed to conform to the CGI standard, although those skilled in the art will recognize that other standards could be used as well.

The Configurable Stresser Overview

The configurable stresser 200 tests computer programs 204, 206, 208 and the connections (210, 212, 214, 216, 218, 220) between them on a Web server 104 by creating virtual Web browsers 202 that transmit commands to the Web server 104 for execution by the computer programs 204, 206, 208. Moreover, the configurable stresser 200 is advantageous in that it combines regression testing with performance testing.

The configurable stresser 200 is useful for testing the synchronization of the Web server threads by generating simultaneous HTTP requests via the virtual Web browsers 202. This tests the robustness of the Web server in a multithreaded environment. Additionally, the configurable stresser 200 tests the reliability in real time of the Web server and computer programs residing on the Web server and allows a user to specify either a limited (i.e., preset) or an unlimited number of HTTP requests to be made by the virtual Web browsers 202. In this manner, the configurable stresser 200 can be used to identify memory leaks, data source connection problems, system limits, etc. at every level (e.g., computers and computer programs, as well as connections between them) at the system tested.

The configurable stresser 200 can be used to perform regression tests in multi-user mode with verification of the HTML results. In particular, a user provides a test guide file containing instructions for testing the computer programs on the Web server 104 and provides reference data indicating the results for successful execution of the test. Then, the configurable stresser 200 compares the HTML results from the test with the reference data and provides a report of the comparisons.

Moreover, the configurable stresser 200 provides insight into Web application performance and scalability, without the overhead of the Web browser graphical user interface ("GUI"), which may slow down the display of HTML. In particular, the processing required to display HTML is coupled to the processing power of the client (e.g., a workstation versus a personal computer). The configurable stresser 200 is advantageous in that it performs testing with the additional processing time that is based on the processing power of the client being removed from the testing process. The configurable stresser 200 tests/stresses Web applications in Common Gateway Interface-Binary ("CGI-BIN") mode or in Application Programming Interface ("API") mode with various Web servers (e.g., ICS, IIS and NS Web servers) with special Uniform Resource Locators ("URLs") that are configurable. This provides insight into performance and scalability for the coupled Web server software 204 and other Web server computer programs 206, 208 without measuring the Web browser displaying phase. Furthermore, the configurable stresser 200 can be used to determine performance of any Server/CGI application or Web server/API application.

The configurable stresser 200 is used within the Internet environment with an easy configuration and installation (one executable). The configurable stresser 200 is portable on major UNIX systems as it has no specific system call. Moreover, the configurable stresser 200 is Web server 104 independent.

The configurable stresser 200 provides an HTML GUI to assist a user with execution of the configurable stresser 200. The HTML GUI provides an input form that allows execution of all commands accessible from the command line. A report of the test results is generated in HTML for easy readability. The configurable stresser 200 is invoked as a CGI-BIN process when the input form is used rather than the command line to invoke the configurable stresser 200.

The configurable stresser 200 measures the accessibility and the responsiveness of a Web server while heavily loaded (e.g., 100 processes launching 10000 HTTP requests each). The configurable stresser 200 can be used to do regression testing in a multi-user mode. Moreover, the configurable stresser 200 provides a JAVA Applet GUI. This will allow a user to launch a very long stress test from a Web browser, without being "logged off" by the timeout of the Web Browser. Additionally, this will allow a user to create the test guide files without knowing the syntax.

Figure 3:
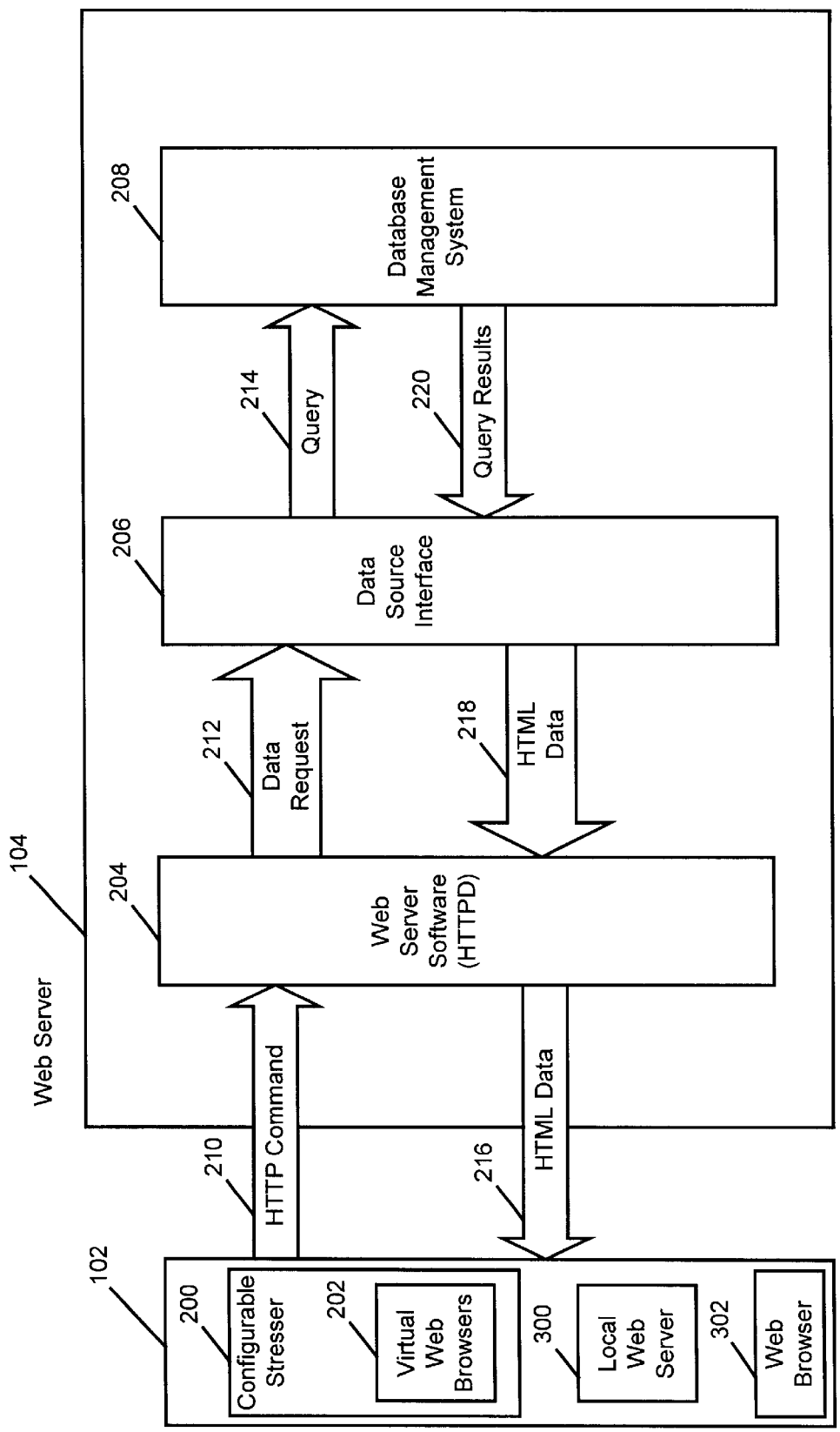
FIG. 3 schematically illustrates the interaction between the client and the server to access data in a database using a HTML GUI according to the preferred embodiment of the present invention.

FIG. 3 schematically illustrates the interaction between the client 102 and the server 104 to access data in a database using a HTML GUI according to the preferred embodiment of the present invention. To execute the configurable stresser 200 using an input form provided by a HTML GUI, a local Web server 300 and a Web browser 302 are used at the client 102. A user invokes the local Web server 300 to obtain and fill in an input form, which includes a launch button that is used to launch the configurable stresser 200. After the testing is completed, the Web browser 302 is used to view the data returned from the testing. A JAVA Applet GUI is a special case of a HTML GUI, but, unlike a HTML GUI, a JAVA Applet GUI is not server dependent. Therefore, the configurable stresser can be launched using a JAVA Applet GUI to execute long tests that may timeout when using the HTML GUI to invoke the configurable stresser 200. When the configurable stresser 200 is launched from the JAVA Applet GUI, the JAVA Applet GUI will connect to the Web server 104 and continue to poll the Web server 104 until the testing is completed and data is obtained.

The Configurable Stresser Architecture

Figure 4:
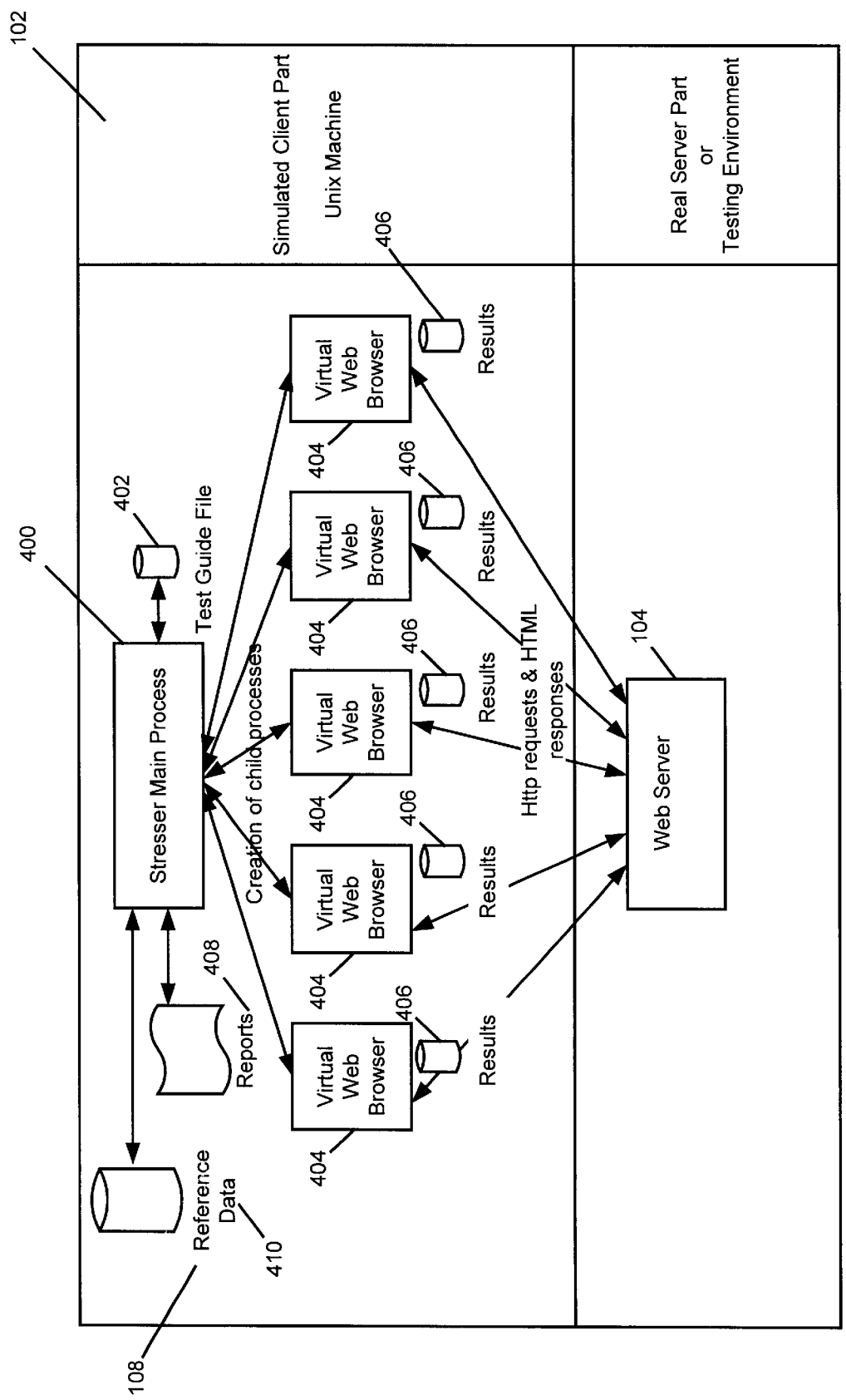
FIG. 4 illustrates a client-server architecture within which the configurable stresser works according to the preferred embodiment of the present invention.

FIG. 4 illustrates a client-server architecture within which the configurable stresser 200 works according to the preferred embodiment of the present invention. A client or simulated client UNIX machine 102 is connected to an actual Web server 104 or a testing environment in which the Web server 104 is simulated. The configurable stresser 200 resides at the client or simulated client UNIX machine 102. The configurable stresser 200 tests the actual server 104 or the testing environment.

Initially, a user generates a test guide file 402 that contains the instructions for testing the Web server 104. Then, the user launches the configurable stresser 200. When launched, a stresser main process 400 of the configurable stresser 200 will generate a requested number of virtual Web browsers 404 (i.e., "child processes"). A user indicates the number of virtual Web browsers to be generated when launching the configurable stresser 200, either via a command line or via an input form. The configurable stresser 200 can simulate many virtual Web browsers 404, each of which connects and sends HTTP requests to the same Web Server. By generating the multiple virtual Web browsers 404, the configurable stresser 200 can "stress" any Web server 104 with many connections (i.e., each virtual Web browser 404 makes a connection) and HTTP requests (i.e., from each virtual Web browser 404) at the same time.

The stresser main process 400 of the configurable stresser 200 parses the test guide file 402 and generates a structure in memory containing information for testing a Web server 104. Then, the main process 400 passes the structure to each virtual Web browser 404. Each virtual Web browser 404 will use this structure to perform testing of the Web server 404 on its own, as a simple UNIX process.

Each virtual Web browser 404 executes the structure representing the test guide file 402 and generates a result file 406 while running the tests specified in the test guide file 402. In particular, each virtual Web browser 404 executes commands specified in the test guide file 402 by transmitting these commands to the Web server 104. The Web server will use programs to interpret and execute the received commands. After execution of a command, the Web server 404 transmits the results of the execution to the virtual Web browser 404 that transmitted that command. The Web server 404 can receive the same or different commands from the different virtual Web browsers 404 simultaneously. This tests the functionality and efficiency of the Web server 404.

Each virtual Web browser 404 stores all the times and incoming data from the Web server, if requested in the test guide file 402. When each virtual Web browser 404 completes testing of the Web server 104, each virtual Web browser 404 compares the results it has received with reference data 410 to create a result file 406. Then, each virtual Web browser 404 transmits the result file 406 to the stresser main process 400. Once all the virtual Web browsers 404 are done, the stresser main process 400 parses all the result files 406 and generates multiple reports stored in one or more report files 408. In particular, the configurable stresser 200 uses the received result files 406 to generate a performance report 408 for each virtual Web browser and a consolidated report 408 of compared test results. The reference data reflects the correct outcome of executing the test guide file 402. The report file 408 may be generated in HTML or as a plain text file, whichever is specified in the test guide file 400.

The configurable stresser 200 may be used in either in a Web mode or a UNIX command line mode. In the Web mode, a user launches the configurable stresser 200 from a Web page and sees the reports generated from the testing returned on a Web page. In the UNIX command line mode, a user launches a test using the UNIX command line. In the UNIX command line mode, the test is executed in the background and the reports can be viewed later. The UNIX command line mode is useful for very long tests that take long to execute (e.g., an entire day). This is especially helpful to avoid timeouts, such as network timeouts or Web timeouts, in which either the Web browser or the Web server is not able to complete its processing within a preset time period and, thus, times out. The UNIX command line mode is also useful for regression tests using the compare and sequential commands, which are described in further detail below. In either mode, a user creates a test guide file 402.

Figure 5:
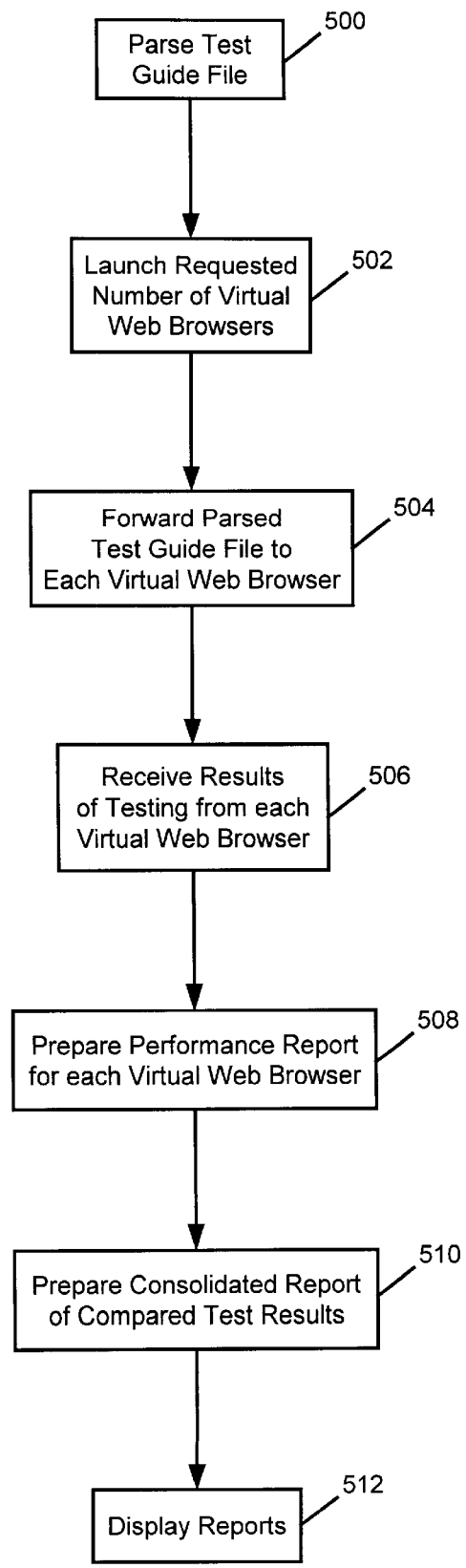
FIG. 5 is a flowchart illustrating the steps performed by the stresser main process of the configurable stresser to stress a Web server according to the preferred embodiment of the present invention.

FIG. 5 is a flowchart illustrating the steps performed by the stresser main process 400 of the configurable stresser 200 to stress a Web server 104 according to the preferred embodiment of the present invention. In Block 500, the stresser main process 400 parses the test guide file 402. In Block 502, stresser main process 400 launches the requested number of virtual Web browsers 404. In Block 504, the stresser main process 400 passes the parsed test guide file 402 to each virtual Web browser 404. In Block 506, the stresser main process 400 receives result files 406 from each virtual Web browser 404. In Block 508, the stresser main process prepares a consolidated report 408 of compared test results. In Block 510, the stresser main process 400 prepares a consolidated report of compared test results. In Block 512, the stresser main process 400 displays the reports 512.

Figure 6:
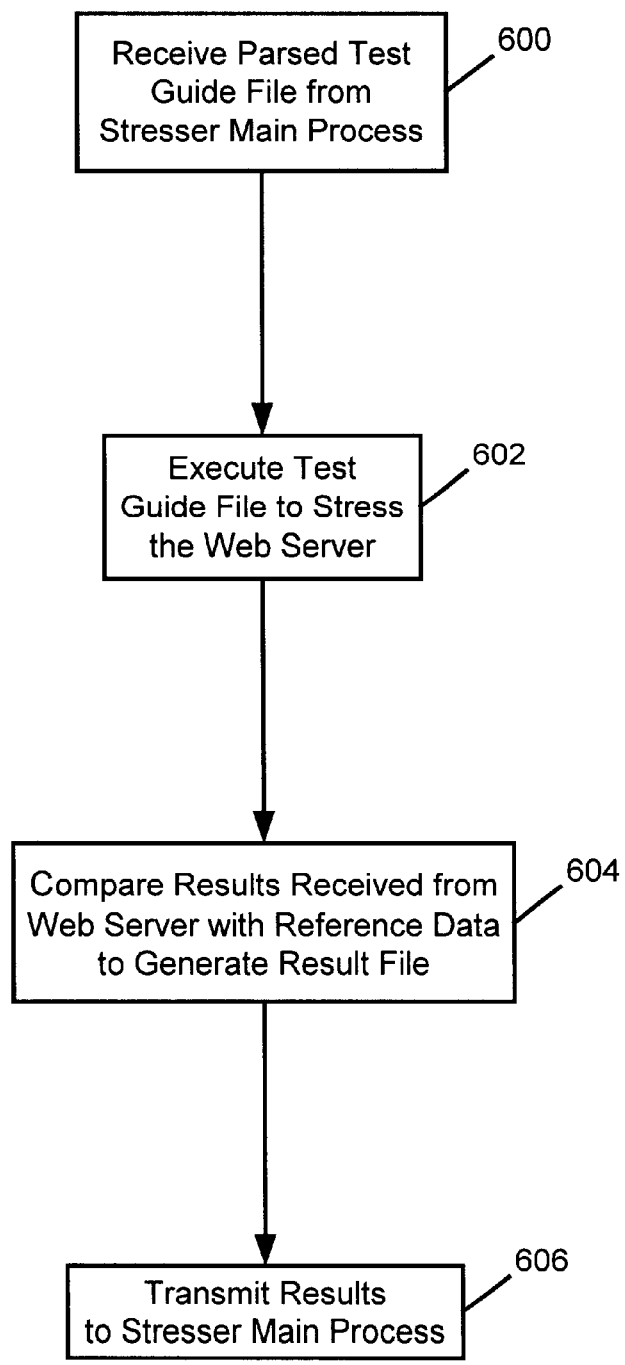
FIG. 6 is a flowchart illustrating the steps performed by each virtual Web browser according to the preferred embodiment of the present invention.

FIG. 6 is a flowchart illustrating the steps performed by each virtual Web browser 404 according to the preferred embodiment of the present invention. In Block 600, each virtual Web browser 404 receives the parsed test guide file 402 from the stresser main process 400. In Block 602, each virtual Web browser 404 executes the parsed test guide file 402 to stress the Web server 104. In Block 604, each virtual Web browser 404 compares the results received from the Web server 104 with reference data 508 to generate a result file 406. In Block 606 each virtual Web browser 404 transmits the result file 406 to the stresser main process 400.

The Test Guide File

A test guide file 402 is a text file, with a very simple syntax, that centralizes all the information necessary for the testing/stressing process.

FIG. 7 illustrates a sample test guide file 700 according to the preferred embodiment of the present invention. The test guide file 700 can contain the following commands:

The comment command defines a comment line. In the preferred embodiment, the comment command is preceded by at least one space.

The hostname command provides the name of the client 102 at which the testing is performed by the configurable stresser 200.

The port command provides the port of the Web server 104 being tested.

The output command defines the location of the result file 406 in which the output of each of the virtual Web browsers 404 is to be stored.

The storefailedonly command indicates that only the results of HTTP requests that failed are stored in the result file 406 defined by the output command. This command is especially useful when a user launches thousands of HTTP requests and does not want to waste disk space with the results of HTTP requests that were processed without problems. Additionally, this command is advantageous in that it is faster to determine where a problem is occurring when only results of HTTP requests that failed are stored. If this command is not specified, all the results will be stored in the result files 406.

The sequential command indicates that all the HTTP requests defined in the test guide file 402 are to be executed sequentially rather than randomly at each virtual Web browser 404. This command is used mainly for regression tests in which tests are typically executed sequentially (i.e., one test after another). This command is exclusive with the mulitplexed command.

The multiplexed command indicates that all the HTTP requests in the test guide file 402 are to be executed in each virtual Web browser 404 based on an identifying index number for each HTTP request. For instance, with a test guide file containing 10 HTTP requests (e.g., URLs), if two virtual Web browsers 202 are started, the URLs 1, 3, 5, 7, and 9 will be executed from the first virtual Web browser 202, and the URLs 2, 4, 6, 8, and 10 will be executed from the second virtual Web browser 202. This command is exclusive with the sequential command.

The random command indicates that each virtual Web browser is to randomly choose all of the specified URLs in the test guide file for testing the Web server 104.

The numberoftest command defines the number of HTTP requests launched by each virtual Web browser 404.

The reqlatency command defines the upper limit of a random waiting time, in milliseconds, between two HTTP requests.

The alltimes command indicates that the configurable stresser 200 should not store all the HTTP request execution times in the result file 406.

The HTTP/x.x command specifies the HTTP protocol used for the requests. For example, HTTP/1.0 may be specified. If a HTTP protocol is not specified, a command that does not comply with the default protocol (i.e., HTTP/1.0) is sent to the Web server.

The authorization command is the userid:password combination that defines the authorization string which will be encoded and passed to the Web server. In the preferred embodiment of the invention, if this command is included in the test guide file 402, the HTTP/1.0 protocol is automatically selected, although other protocols may be used.

The timer:<!timerlabel=timeinunits>:Statistic explanation command defines a user-defined timer that has been added in a user-defined application. The timer can be in a script generated HTML page, in a data source interface macro file, in a CGI-BIN program, or other locations. The timer is used to test the timing of the computer programs 204, 206, 208, or any other program on the Web server 104, as well as the connections (210, 212, 214, 216, 218, 220) between them. The stresser main process 400 will parse the HTML, find the timers, and store the differences for each HTTP request. In a preferred embodiment of the invention, the timers are set in floating point, although other types may be used. To start the timer, the following text is used: <!timerlabel.Start=timeinunits>. To stop the timer, the following text is used: <!timerlabel.Stop=timeinunits>. Then, the configurable stresser 200 will generate final statistics of the times measured between the Start and Stop times and provide a report for each timer.

The following is a sample result that may be provided in generated HTML pages:

. . . user generated HTML code . . .

<!timer1.Start=timeinunits>

. . . user generated HTML code . . . measuring T1 milliseconds

```
<!timer2.Stop=timeinunits>
. . . user generated HTML code
```
The following is sample pseudocode that could be implemented in a CGI-BIN program:

```
int timeinmilliseconds ( )
{
   return (. . .); // return a time in milliseconds.
}
. . . user C code . . .
printf("<!timer1.Start=%d>\n",timeinmilliseconds( ));
. . . user C code . . .
printf("<!timer1.Stop=%d>\n",timeinmilliseconds( ));
. . . user C code . . .
```

In the test file, the timer may be defined using the following text:

timer:timer1:EXEC SQL Statement "SELECT*FROM EMP"

By using information provided by the use of timers, the configurable stresser 200 lets a user determine whether or not the systems and computer programs being tested are performing well or regressing for critical parts of the system (e.g., 206 when the processing time of this software is important).

For each start timer, there needs to be a stop timer. If there is a mismatch of timers, then the configurable stresser 200 will continue its testing, but will ignore the timers. If a timer is defined, the same timer can be used multiple times in a HTML page. All the times will be cumulated for that page. The following is sample psuedocode for using multiple timers in a CGI-BIN program where the final time will be the sum of the timers (T1+T2):

```
static clock_t orgclock;
float timeinmilliseconds (int ctype)
{
   return ((clock-orgclock)/(CLOCKS_PER_SEC/1000)
      ); // return
}
main ( )
{
orgclock=clock ( );
. . . user C code . . .
printf("<!timer1.Start=%d>\n",timeinmilliseconds( ));
. . . user C code . . . measuring T1 milliseconds
printf("<!timer1.Stop=%d>\n",timeinmilliseconds( );
. . . user C code . . .
printf("<!timer1.Start=%d>\n",timeinmilliseconds( );
. . . user C code . . . measuring T2 milliseconds
printf("<!timer1.Stop=%d>\n",timeinmilliseconds( );
. . . user C code . . .
```

The GET command is the HTTP request transmitted by a virtual Web browser 404 to a Web server 104. The test guide file 402 can contain multiple GET commands. Each virtual Web browser 404 will choose randomly one of the GET commands each time it has to launch a new HTTP request. Random selection is useful in avoiding locks in data source tests while using UPDATE, DELETE or INSERT commands.

The verifydir=./test command identifies the directory in which the reference data is stored.

The compare command defines the location of the reference data 410 file used to compare the resulting HTML (i.e., results files 406) coming back from the Web server 104 via the virtual Web browsers 404. This command is placed after each GET command. The character 13 (lf) must be filtered from the reference data 410 because the configurable stresser 200 filters them automatically from the result files 406. The HTML header should be deleted from the result file 406 prior to the comparison because some fields in the header have changing values (e.g., date and time) and so cannot be compared with static reference data 410. The comparison identifies the HTTP requests that failed. The following sample output is provided when a compare command is used in the test guide file 402:

$>tester tt2 3 (Launching the tester with tt2 test guide file with 3 processes)

. . .

. . .

rc=1[0]7672.0,98320

===========================

Nb processes launched: 3

Connections failed: 1/60 (one connection was bad . . . server may be overloaded)

Compared results succeed/failed: 3/56 (56 files didn't come back correctly from the web server)

Avg Throughpu/process.0.000 Kb/s

. . .

The rc code in front of the process timing is the comparison return code where 0=result same and 1=result different.

The Web Mode

In the Web mode, the configurable stresser 200 can be invoked from a Web page. This is very useful for users who just want to do simple tests on the fly. The Web mode is simpler than the UNIX command line mode and contains all of the commands available from the command line mode.

Figure 8:
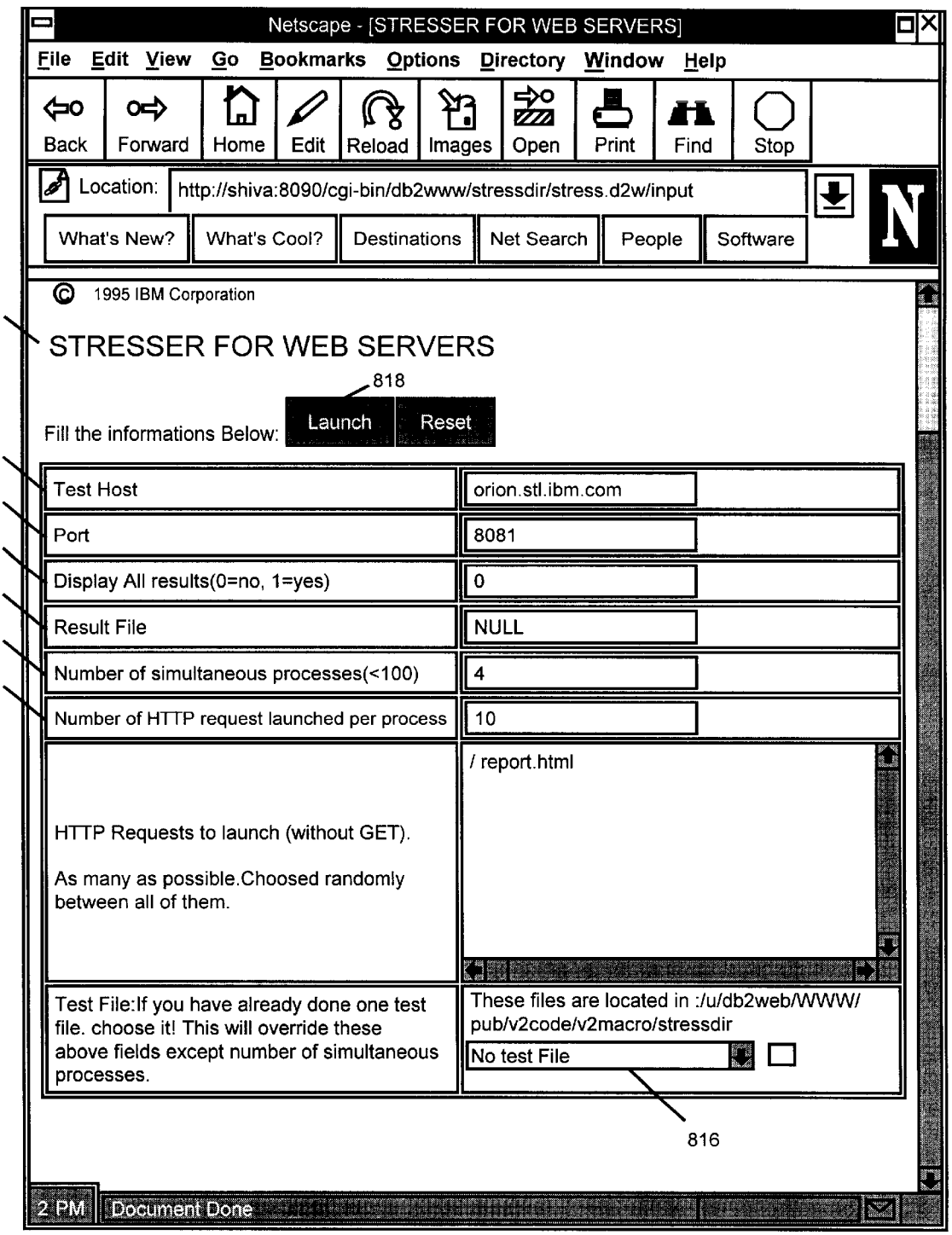
FIG. 8 illustrates a Web page (i.e., HTML input form) for launching the configurable stresser according to the preferred embodiment of the present invention.

FIG. 8 illustrates a Web page 800 (i.e., HTML input form) for launching the configurable stresser 200 according to the preferred embodiment of the present invention. Once in the Web page 800, a user fills in the form with the information needed to perform testing. In particular, the user fills in the host name 802, port 804, store failed only option 806, result file location 808, number of processes 810, number of HTTP requests 812 to launch for each process, and the HTTP requests to launch 814. Additionally, a user can specify a particular file containing the HTTP requests using a list box 816. Once the form is completed, the user clicks on the Launch button 818 using an input device, such as a mouse. Once the test is performed, the results are displayed on a Web page.

When in the Web mode, if a user provides a result file name, the results are saved in that file, otherwise, the configurable stresser 200 creates a temporary result file, which is destroyed when the test is completed.

FIG. 9 illustrates a Web page 900 for launching the configurable stresser 200 when an existing test guide file 402 is selected according to the preferred embodiment of the present invention. In particular, a user can specify the test guide file 402 using a list box 902. After the test guide file 402 is identified, only the number of simultaneous processes field and the number of HTTP requests launched per process fields are filled out on the form. Then, the configurable stresser can be launched using the Launch button, with the results of the test being displayed on a Web page.

The virtual Web browsers 404 and the Web Server 104 usually have some pre-set time limits (i.e., timeouts) for waiting for a response. If the test a user is performing is longer than this timeout, then the configurable stresser 200 will return the message "No data returned" instead of providing a result page. If this occurs, the user can launch the test in the UNIX Command line mode.

FIG. 10 illustrates the HTML results from the configurable stresser 200 when a test launched in the Web mode is completed according to the preferred embodiment of the present invention. The configurable stresser 200 provides statistics 1000 for each process. The configurable stresser 200 also provides result information 1002. Moreover, the configurable stresser provides a copy of the test file used 1004.

Figure 11:
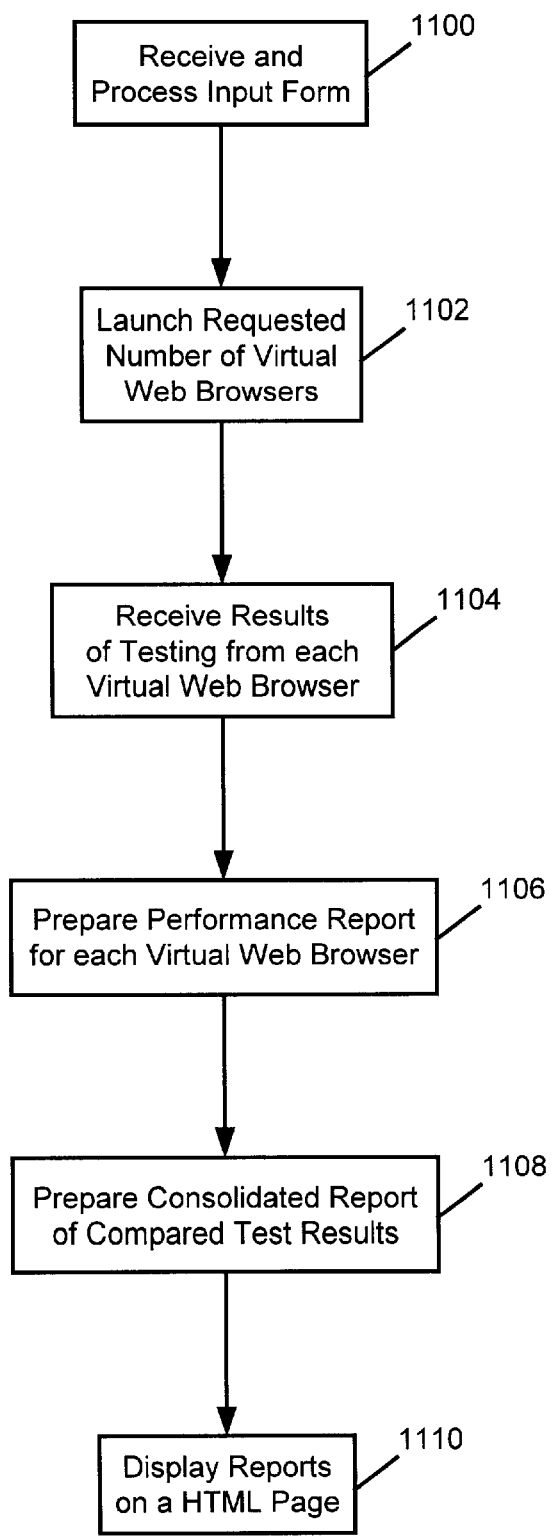
FIG. 11 is a flowchart illustrating the steps performed by the stresser main process of the configurable stresser when the configurable stresser is launched from the Web mode according to the preferred embodiment of the present invention.

FIG. 11 is a flowchart illustrating the steps performed by the stresser main process 400 of the configurable stresser 200 when the configurable stresser 200 is launched from the Web mode according to the preferred embodiment of the present invention. In Block 1100, the stresser main process 400 receives and processes the HTML input form. In Block 1102, the stresser main process 400 launches the requested number of virtual Web browsers 404 to perform the requested testing. In Block 1104, the stresser main process 400 receives results 406 from each virtual Web browser 404. In Block 1106, the stresser main process 400 prepares a performance report 408 for each virtual Web browser 404. In Block 1108, the stresser main process 400 prepares a consolidated report 408 of compared test results. In Block 1110, the stresser main process 400 displays the report 408 as a HTML page.

The UNIX Command Line Mode

The UNIX command line mode is typically used for regression tests because it does not have the time limits that Web browsers 404 and Web servers 104 have, although this mode can be used for tests of any length. A user can invoke the configurable stresser 200 from a local directory to execute in the user's own environment.

To launch the stresser from the command line a user will have to open a UNIX shell and create a test guide file 402. Moreover, a user indicates whether the data in the report file 408 should be displayed as a HTML page or as text when launching the configurable stresser 200. In particular, to view the data in the report file as a HTML page, the configurable stresser 200 is launched by the following command, which redirects the results from the test into a specified result file 406:

tester test_guide_file nb_processes HTML>/directory/
      result_html_file.html To view the data in the report file as a text file through a UNIX Web browser, the configurable stresser 200 is launched by the following command:

tester test_guide file nb_processes>/result_file.txt

FIG. 12 illustrates the results from the configurable stresser 200 when a test launched in the UNIX command line mode is completed, with the HTML page option set, according to the preferred embodiment of the present invention. The HTML page 1200 contains information about the HTTP request latency 1202, the number of requests that failed 1204, the average throughput for each process 1206, and other information.

Figure 13:
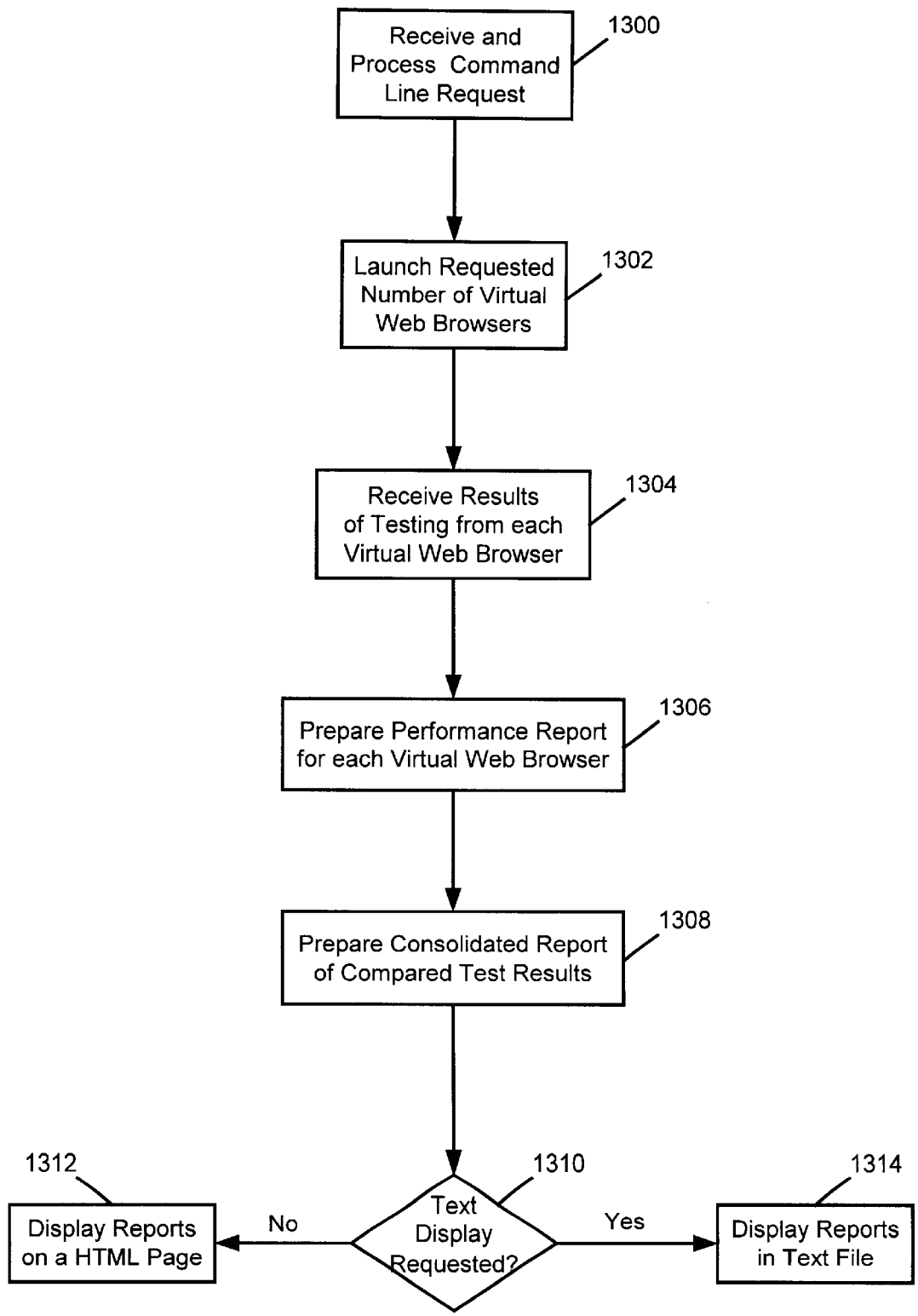
FIG. 13 is a flowchart illustrating the steps performed by the stresser main process of the configurable stresser when the configurable stresser is launched from the UNIX command line mode according to the preferred embodiment of the present invention.

FIG. 13 is a flowchart illustrating the steps performed by the stresser main process 400 of the configurable stresser 200 when the configurable stresser 200 is launched from the UNIX command line mode according to the preferred embodiment of the present invention. In Block 1300, the stresser main process 400 receives and processes the command line request. In Block 1302, the stresser main process 400 launches the requested number of virtual Web browsers 404 to perform the requested testing. In Block 1304, the stresser main process 400 receives results from each virtual Web browser 404. In Block 1306, the stresser main process 400 prepares a performance report 408 for each virtual Web browser 404. In Block 1308, the stresser main process 400 prepares a consolidated report 408 of compared test results. In Block 1310, the stresser main process 400 determines whether text display was requested. If text display was not requested, in Block 1312, the stresser main process 400 displays the reports 408 as a HTML page. If text display was requested, in Block 1314, the stresser main process 400 displays the reports 408 as a text file.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer implemented configurable stresser. The present invention provides improved testing of Web servers on the internet. Additionally, the present invention provides testing of Web servers in a real world environment using simulated virtual Web browsers. Furthermore, the present invention enables users to create tests for their particular Web server environments.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of testing a server computer by transmitting commands to the server computer from a client computer connected via a network, each command being performed by the server computer to access data from a data source stored on a data storage device connected to the server computer, the method comprising the steps of:

at the client computer, creating one or more virtual browsers for transmitting commands to the server computer, wherein each virtual browser receives a test guide file and determines which commands are to be executed from the test guide file;

receiving compared test results from each virtual browser indicating a response to each transmitted command received from the server computer; and consolidating the received test results into a report of compared test results.

2. The method of claim 1, further comprising:

receiving a test guide file containing commands to be transmitted to the server computer;

parsing the received test guide file; and forwarding the parsed test guide file to each virtual browser.

3. The method of claim 2, further comprising:

under control of each virtual browser, executing commands in the received test guide file by transmitting each command to the server computer;

receiving responses from the server computer for each transmitted command; and comparing the received responses to reference data.

4. The method of claim 3, further comprising, under control of each virtual browser, the step of preparing a result file based on the received responses.

5. The method of claim 1, wherein, prior to creating one or more virtual browsers, further comprising the step of launching the testing from a HTML page.

6. The method of claim 5, further comprising the step of displaying the prepared report on a HTML page.

7. The method of claim 6, further comprising the step of receiving a HTML form containing testing information.

8. The method of claim 1, wherein prior to creating one or more virtual browsers, further comprising the step of launching the testing from a command line.

9. The method of claim 8, further comprising the step of displaying the prepared report on a HTML page.

10. The method of claim 8, further comprising the step of displaying the prepared report in a text file.

11. The method of claim 1, wherein, under control of each virtual browser, further comprising the step of transmitting commands for a period that exceeds a timeout period.

12. The method of claim 1, wherein, under control of the server computer, further comprising the step of executing commands using one or more programs.

13. The method of claim 1, further comprising:

receiving performance data from each virtual browser; and preparing a performance report for each virtual browser.

14. The method of claim 1, wherein the testing further comprises combining regression and performance tests.

15. An apparatus for testing a server computer, comprising:

a server computer having a data storage device connected thereto, wherein the data storage device stores a data source;

one or more computer programs, performed by a client computer connected to the server computer via a network, for creating one or more virtual browsers for transmitting commands to the server computer, wherein each virtual browser receives a test guide file and determines which commands are to be executed from the test guide file, receiving compared test results from each virtual browser indicating a response to each transmitted command received from the server computer, and consolidating the received test results into a report of compared test results.

16. The apparatus of claim 15, further comprising:

means for receiving a test guide file containing commands to be transmitted to the server computer;

means for parsing the received test guide file; and means for forwarding the parsed test guide file to each virtual browser.

17. The apparatus of claim 16, further comprising:

under control of each virtual browser, means for executing commands in the received test guide file by transmitting each command to the server computer; and means for receiving responses from the server computer for each transmitted command.

18. The apparatus of claim 15, further comprising, under control of each virtual browser, means for preparing a result file based on the received responses.

19. The apparatus of claim 15, wherein, prior to creating one or more virtual browsers, further comprising the means for launching the testing from a HTML page.

20. The apparatus of claim 19, further comprising the means for displaying the prepared report on a HTML page.

21. The apparatus of claim 20, further comprising the means for receiving a HTML form containing testing information.

22. The apparatus of claim 15, wherein prior to creating one or more virtual browsers, further comprising the means for launching the testing from a command line.

23. The apparatus of claim 22, further comprising the means for displaying the prepared report on a HTML page.

24. The apparatus of claim 22, further comprising the means for displaying the prepared report in a text file.

25. The apparatus of claim 15, wherein each virtual browser comprises means for transmitting commands for a period that exceeds a timeout period.

26. The apparatus of claim 15, wherein the server computer comprises means for executing commands using one or more programs.

27. The apparatus of claim 15, further comprising:

means for receiving performance data from each virtual browser; and means for preparing a performance report for each virtual browsers.

28. The apparatus of claim 15, wherein the means for testing further comprises the means for combining regression and performance tests.

29. An article of manufacture comprising a computer program carrier readable by a client computer and embodying one or more instructions executable by the client computer to perform method steps for testing a server computer connected to the client computer via a network, the command being performed by the server computer to access data from a data source stored in a data storage device connected to the server computer, the method comprising the steps of:

at the client computer, creating one or more virtual browsers for transmitting commands to the server computer, wherein each virtual browser receives a test guide file and determines which commands are to be executed from the test guide file;

receiving compared test results from each virtual browser indicating a response to each transmitted command received from the server computer; and consolidating the received test results into a report of compared test results.

30. The method of claim 29, further comprising:

receiving a test guide file containing commands to be transmitted to the server computer;

parsing the received test guide file; and forwarding the parsed test guide file to each virtual browser.

31. The method of claim 30, further comprising:

under control of each virtual browser, executing commands in the received test guide file by transmitting each command to the server computer; and receiving responses from the server computer for each transmitted command.

32. The method of claim 31, further comprising, under control of each virtual browser, the step of preparing a result file based on the received responses.

33. The method of claim 29, wherein, prior to creating one or more virtual browsers, further comprising the step of launching the testing from a HTML page.

34. The method of claim 33, further comprising the step of displaying the prepared report on a HTML page.

35. The method of claim 34, further comprising the step of receiving a HTML form containing testing information.

36. The method of claim 29, wherein prior to creating one or more virtual browsers, further comprising the step of launching the testing from a command line.

37. The method of claim 36, further comprising the step of displaying the prepared report on a HTML page.

38. The method of claim 36, further comprising the step of displaying the prepared report in a text file.

39. The method of claim 29, wherein, under control of each virtual browser, further comprising the step of transmitting commands for a period that exceeds a timeout period.

40. The method of claim 29, wherein, under control of the server computer, further comprising the step of executing commands using one or more programs.

41. The method of claim 29, further comprising:

receiving performance data from each virtual browser; and preparing a performance report for each virtual browser.

42. The method of claim 29, wherein the testing further comprises combining regression and performance tests.

* * * * *